United States Patent [19]

Pelz

[11] 4,439,053

[45] Mar. 27, 1984

[54] SWIVEL JOINT, ESPECIALLY FOR SEATS WITH ADJUSTABLE BACKREST

[75] Inventor: Herbert Pelz, Remscheid, Fed. Rep. of Germany

[73] Assignee: Keiper Automobiltechnik GmbH & Co. KG, Remschied-Hasten, Fed. Rep. of Germany

[21] Appl. No.: 294,176

[22] Filed: Aug. 19, 1981

[30] Foreign Application Priority Data

Aug. 28, 1980 [DE] Fed. Rep. of Germany ....... 3032374

[51] Int. Cl.³ ............................................. F16C 11/00
[52] U.S. Cl. ..................................... 403/101; 403/84; 297/362; 74/461; 74/443
[58] Field of Search .................... 403/101, 91, 161, 84; 297/320, 371, 366, 362; 74/461, 443, 410, 411; 464/89, 93, 158

[56] References Cited

U.S. PATENT DOCUMENTS

| | | |
|---|---|---|
| 3,667,804 | 6/1972 | Yasui et al. ...................... 297/366 X |
| 3,808,906 | 5/1974 | Bowers .................................. 74/443 |
| 4,020,717 | 5/1977 | Johnson ......................... 297/362 X |
| 4,184,380 | 1/1980 | Rivin .................................... 74/461 |
| 4,187,579 | 2/1980 | Gensicke ....................... 297/362 X |
| 4,195,884 | 4/1980 | Muhr et al. ........................ 297/362 |

Primary Examiner—Cornelius J. Husar
Assistant Examiner—Joseph A. Fischetti
Attorney, Agent, or Firm—Michael J. Striker

[57] ABSTRACT

A swivel joint, especially for seats with an adjustable back rest, comprises two link members connected to each other by a pivot pin and a device for angularly adjusting the two link members with respect to each other and for holding the same in any adjusted position and comprising an internal spur integral with one link member and meshing with a spur gear integral with the other link member in which one of the gears is mounted on an eccentric portion of a pivot pin, wherein at least one and preferably both gears are provided at the base lands thereof with elastic buffer elements for compensating tolerances and for eliminating noise.

4 Claims, 7 Drawing Figures

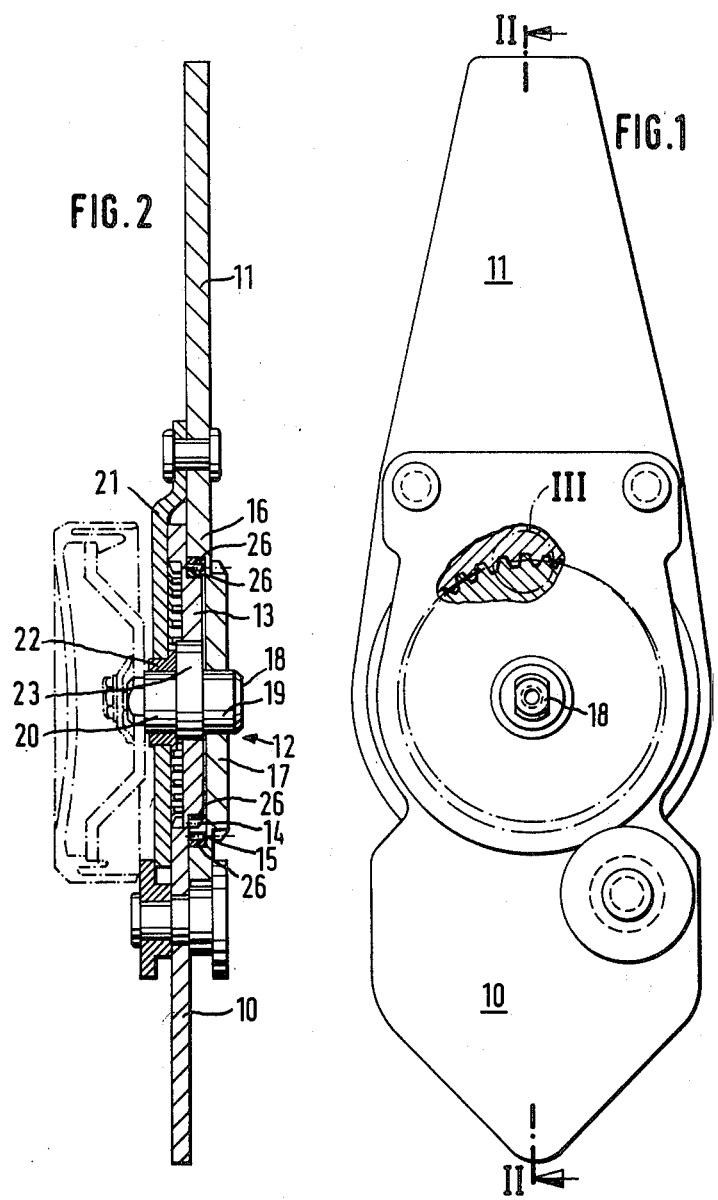

SWIVEL JOINT, ESPECIALLY FOR SEATS WITH ADJUSTABLE BACKREST

BACKGROUND OF THE INVENTION

The present invention relates to a swivel joint, especially for seats with an adjustable backrest in which two link members are tiltably connected to each other by a pivot pin and which is provided with a device for angularly adjusting the link members with respect to each other and for fixing the same in any adjusted position and comprising an internal gear integral with one of the members and meshing with the spur gear integral with the other of the members and in which the turnable pivot pin is provided with an eccentric portion on which one of the gears is mounted.

A swivel joint of the above-mentioned construction is disclosed in the German Pat. No. 12 97 496 in which FIG. 4 shows a swivel joint in which the link member connected with the seat is integral with a spur gear turnably mounted on an eccentric portion of the pivot pin. The link member connected to the backrest is integrally connected with an internal gear meshing with the spur gear and mounted by means of a disc on a central portion of the pivot pin. The afore-mentioned disc carrying the internal gear on the central portion of the pivot pin is formed from elastic material. This elastic annular disc serves to compensate any machining tolerances. Even though tolerances of the gearing as well as that of the pivot pin and the mounting thereof may be compensated by the elastic annular disc, this elastic annular disc is not able to serve for damping the noise produced during adjustment of the swivel joint especially in the region of the teeth of the gears since the noise during the metallic engagement of the gears will evidently not be dampened by this known arrangement.

Additional known arrangements for tolerance compensation, as for instance the arrangement of the eccentric on the pivot pin with intermediate spring buffers are not adapted to reduce the noise occurring during the adjustment of the swivel joint.

SUMMARY OF THE INVENTION

It is an object of the present invention to provide a swivel joint of the above-mentioned kind which not only permits compensation of machining tolerances, but which will also eliminate the noise in the gearing region of the arrangement during adjustment of the swivel joint.

This problem is solved in accordance with the present invention by arranging elastic buffer elements at the bottom lands of at least one of the gears. Since the teeth of the gears have at the top lands thereof a smaller width than at the bottom lands, the buffer material at the bottom lands may yield in radial outward direction when the teeth of the opposite gear compress the elastic buffer elements. Due to the elasticity of the buffer elements, the clearance at the pivot pin will be eliminated and the flanks of the teeth of the two gears will not abut with an impact against each other, but the buffer elements will dampen the impact of the flanks of the cooperating gears during their relative movement. This damping effect can be advantageously increased if such elastic buffer elements are provided at the bottom lands of both gears. The buffer elements constructed of an elastic deformable material may for instance consist of an elastomer which is injected at the bottom lands of each gear. Thereby it is advantageous that the distance between the addendum circle of one gear and the dedendum circle of the other gear is held greater than usual in order to provide a sufficient space for the elastic buffer elements. The use of such elastic buffer elements will assure a uniform and soft run of the two gears without any rattling of the gearing. An additional advantage of this arrangement is that the teeth of the gears and the eccentric pivot pin may be manufactured at larger tolerances as usual.

The buffer elements may be mounted in a simple manner at the bottom lands of one gearing if, in accordance with a further feature of the present invention, an annular groove concentric with and radially spaced a small distance from the dedendum circle of one gear is provided and a plurality of radially extending cutouts respectively leading from this groove to the bottom lands between the flanks of all teeth are foreseen and in which the elastic buffer elements are integrally connected to each other by a ring located in and filling the aforementioned annular groove and by webs located in and filling the afore-mentioned cutouts. The annular groove is preferably of V-shaped cross-section and the cutouts have each a width substantially equal to the spacing between facing flanks of adjacent teeth.

The annular groove, the cutouts are formed together with the teeth of the gears preferably by a coining operation which is especially advantageous for the mass fabrication of the swivel joint.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partially sectioned front view of the swivel joint according to the present invention with the handle shown in dash-dotted line in FIG. 2 removed;

FIG. 2 is a cross-section of the swivel joint taken along the line II—II of FIG. 1;

DESCRIPTION OF THE PREFERRED EMBODIMENTS

Figure 3:
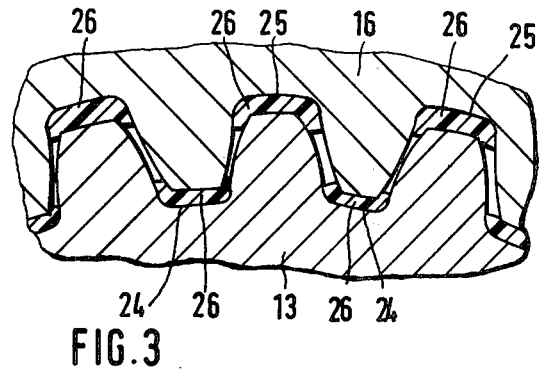
FIG. 3 shows the portion III shown in FIG. 1 at an enlarged scale.

The swivel joint according to the present invention illustrated in FIGS. 1 and 2 comprises essentially a link member 10 adapted to be fastened to a seat, a link member 11 adapted to fastened to the backrest as well as an adjusting device 12. The link member 10 is provided in the region of one end thereof with a spur gear 13 for instance formed by coining operation integral with the link member 10 and having an outer gearing 14 which meshes with the internal gearing 15 of a gear 16 integrally formed with the link member 11 likewise by coining operation. The adendum circle of the outer gearing 14 is smaller than the root circle of the inner gearing 15 at least by the height of a tooth. Accordingly, the number of teeth of the gearings 14 and 15 differ by at least one tooth from each other, whereby the number of teeth of the inner gearing 15 is greater than the number of teeth of the outer gearing 14. The arrangement is made in such a manner that the inner gearing 15 of the link member 11 can roll off on the outer gearing 14 of the spur gear 13 of the link member 10.

The disc 17 offset during forming of the inner gear 15 from the remainder of the link member 11 is mounted on a section 19 of a pivot pin 18, which is provided with a further section 20 concentric with the section 19. The section 20 of the pivot pin 18 is turnably mounted in a bushing 22 which in turn is mounted in a bore of a bearing shield 21 overlapping the spur gear 13 and fixedly connected, for instance by riveting to the link member 11. The pivot pin 18 comprises between the concentric sections 19 and 20 an eccentric portion 23 on which the spur gear 13 is turnably mounted, whereby the eccentricity of the eccentric 23 with respect to the axis of the sections 19 and 20 of the pivot pin correspond about to the difference between the radius of the dedendum circle of the internal gearing 15 and the dedendum circle of the outer gearing 14.

As best shown in FIG. 3, there are provided in the illustrated embodiment elastic buffer elements 26, formed for instance of silicon rubber or the like, at the bottom lands 24 of the gear 13 as well as on the bottom lands 25 of the gear 16. The elastomeric material is injected into the bottom lands of the gears and is dimensioned in such a manner that the buffer elements project with beads between the flanks of the teeth.

Figure 8:
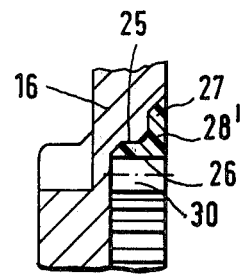
FIG. 8 is a cross-section illustrating a modification of the arrangement shown in FIG. 4.
Figure 4:
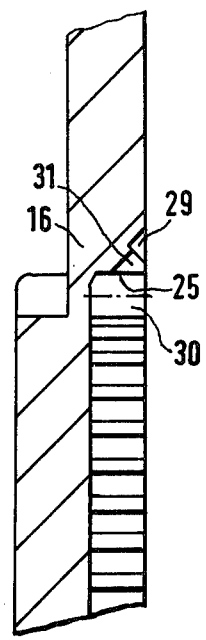
FIG. 4 is a cross-section through the gearing region of the internal gear without the buffer element inserted therein.
Figure 5:
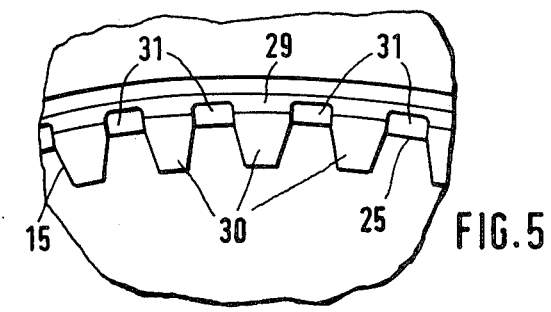
FIG. 5 is a front view of part of the internal gear without the buffer elements located therein.
Figure 6:
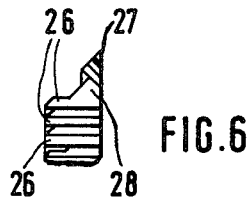
FIG. 6 is a cross-section through the elastic ring and part of the buffer elements connected thereto.
Figure 7:
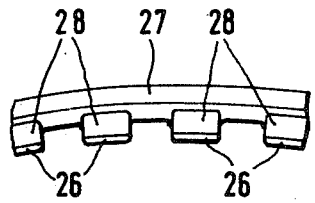
FIG. 7 is a front view of the arrangement shown in FIG. 6.

The buffer elements 26 may not only be applied by injection to the bottom lands of the gears, but in order to hold the buffer elements 26 at the bottom lands it is also possible, as shown in FIGS. 6 and 7, to connect the buffer elements 26 spaced from each other respectively by a circular pitch over webs 28 to a ring 27 of for instance triangular cross-section. The ring 27 partly shown in FIGS. 6 and 7 holding the buffer elements 26 is adapted to be used with the spur gear 16, whereby the buffer elements with the webs 28 are directed to the center of the ring 27. It is to be understood that in a ring to be used with the gear 13, the buffer elements 26 and the webs 28 are to be provided at the outer side of the ring extending away from the center thereof, and respectively spaced from each other through a circular pitch. In order to receive the ring 27, the gear 16 is provided in radially spaced and concentric relationship with its dedendum circle with an annular groove 29 of a cross-section corresponding to the cross-section of the ring. The gear is further provided with a plurality of cutouts 31 respectively extending from the inner surface of the groove 29 between the teeth 30 of the inner gearing 15 and of a width substantially corresponding to the bottom lands of the teeth 30 and adapted to receive the webs 28 connecting the ring 27 with the buffer elements 26. The cutouts 31 extend, as best shown in FIG. 4 inclined to the bottom lands 25. A slight modification is shown in FIG. 8 in which the form of the ring 27 and that of the buffer elements 26 is the same as shown in FIGS. 4–7, in which, however, the webs 28' extend in radial direction substantially normal to the bottom lands 25.

The embodiments shown in FIGS. 4–8 illustrate the provision of buffer elements in a gear provided with an internal gearing in which the buffer elements are integrally connected to a ring. As already mentioned above, such buffer elements integrally connected by a ring may also be provided at the spur gear 13 having an outer gearing 14. In this case the annular groove for receiving the ring provided with the buffer element is arranged radially inwardly of the dedendum circle of the gear 13, whereby corresponding cutouts 31 are provided between the annular groove and the respective bottom land of the teeth of the gear 13.

While it is possible to form the annular groove and the cutouts for respectively receiving the ring and the webs by a machining operation, it is advantageous by mass produced articles, such as the swivel joint according to the present invention, to form the annular groove, the connecting cutouts together with the teeth of the gears by a coining operation.

It will be understood that each of the elements described above, or two or more together, may also find a useful application in other types of swivel joints, especially with adjustable backrests differing from the types described above.

While the invention has been illustrated and described as embodied in a swivel joint especially for seats with adjustable backrests in which at least one of the gears of the adjusting mechanism for the swivel joint is provided with elastic buffer elements mounted at the bottom lands of the one gear, it is not intended to be limited to the details shown, since various modifications and structural changes may be made without departing in any way from the spirit of the present invention.

An adjusting mechanism in which at least one of the gears is provided with such elastic buffer elements may also be used not only on swivel joints for seats with adjustable backrests but also in other devices which are liable to produce noise during their adjustment as for instance window lifters, mechanisms for adjusting the height of seats or similar arrangements.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A swivel joint, especially for seats with adjustable backrests, comprising a first link member adapted to be fixed to a seat; a second link member adapted to be fixed to a back rest; a pivot pin having a pair of coaxial cylindrical portions and an eccentric portion arranged between and integral with said coaxial portions; means for angularly adjusting said first and said second link member with respect to each other and for holding the same in any adjusted position and comprising an internal gear integral with one of said link members, a spur gear integral with the other of said link members and having teeth meshing with teeth of said internal gear, the gear integral with the other of the said first and second link members being mounted on said eccentric portion of said pivot pin; means connected to the one of said first and second link members for turnably mounting said coaxial cylindrical portions of said pivot pin; and elastic buffer elements mounted at the bottom lands of at least one of said gears, wherein at least one of said gears is provided with an annular groove concentrically arranged and axially spaced at a small distance from the dedendum circle thereof and a plurality of radially extending cutouts respectively leading from said groove to the bottom lands between the flanks of all teeth, said elastic buffer elements being integrally connected to each other by a ring located in and filling said annular groove and webs located in and filling said cutouts.

2. A swivel joint, especially for seats with adjustable back rests as defined in claim 1, wherein said elastic buffer elements are mounted at the bottom lands of both gears.

3. A swivel joint especially for seats with adjustable back rests as defined in claim 1, wherein said annular groove is V-shaped and wherein said cutouts have each a width substantially equal to the spacing between facing flanks of adjacent teeth.

4. A swivel joint, especially for seats with adjustable back rests as defined in claim 1, wherein said annular groove, said cutouts are formed together with the teeth of said gears by a coining operation.

* * * * *